Nov. 13, 1951     A. E. DENTLER     2,574,629
FRICTION SHOCK ABSORBING MECHANISM
Filed Aug. 12, 1946     2 SHEETS—SHEET 1
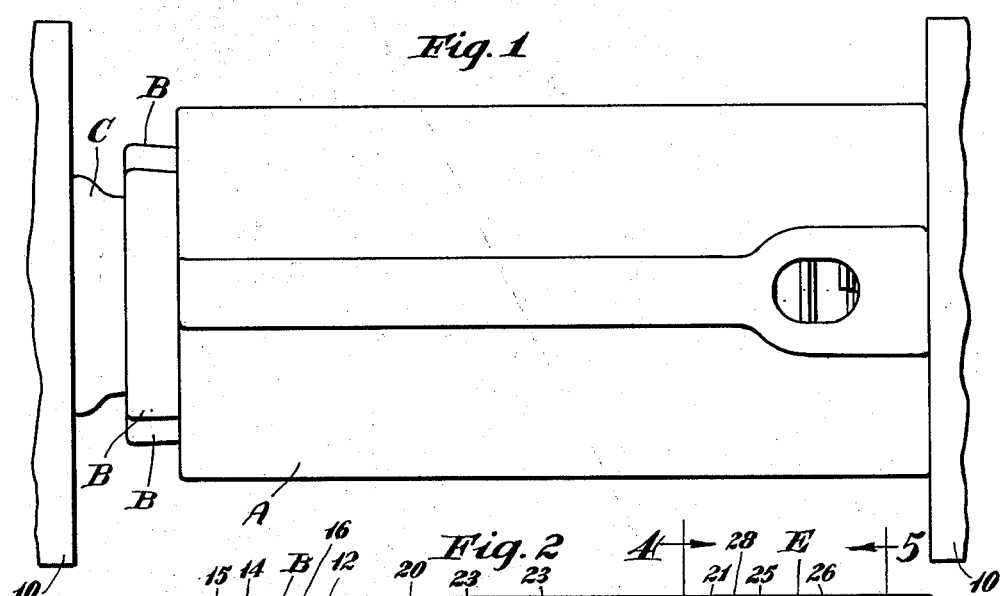
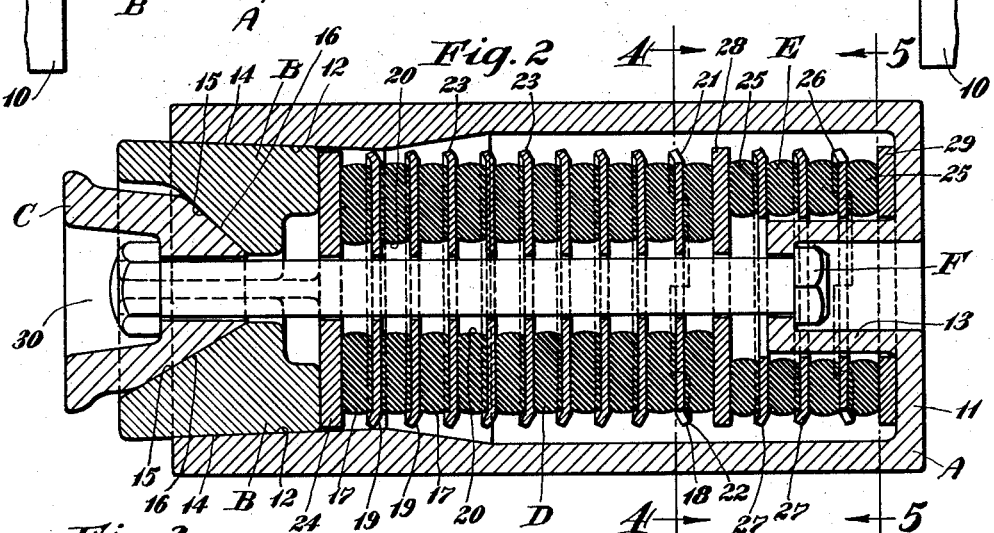
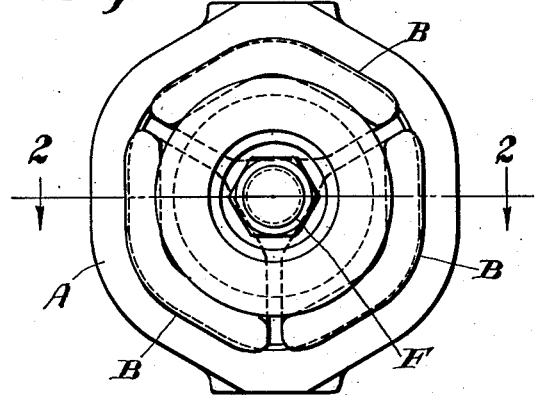
Inventor
Arnold E. Dentler
By Henry Fuchs
Atty.

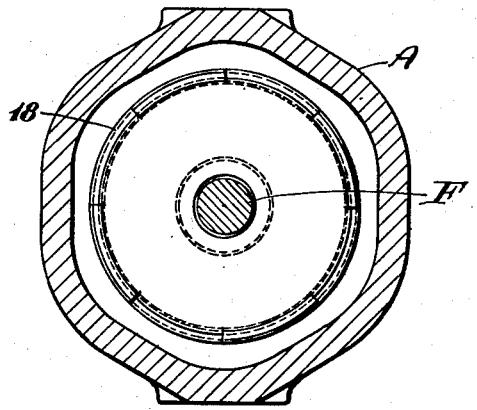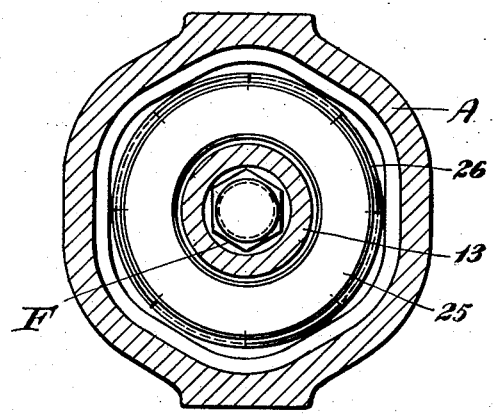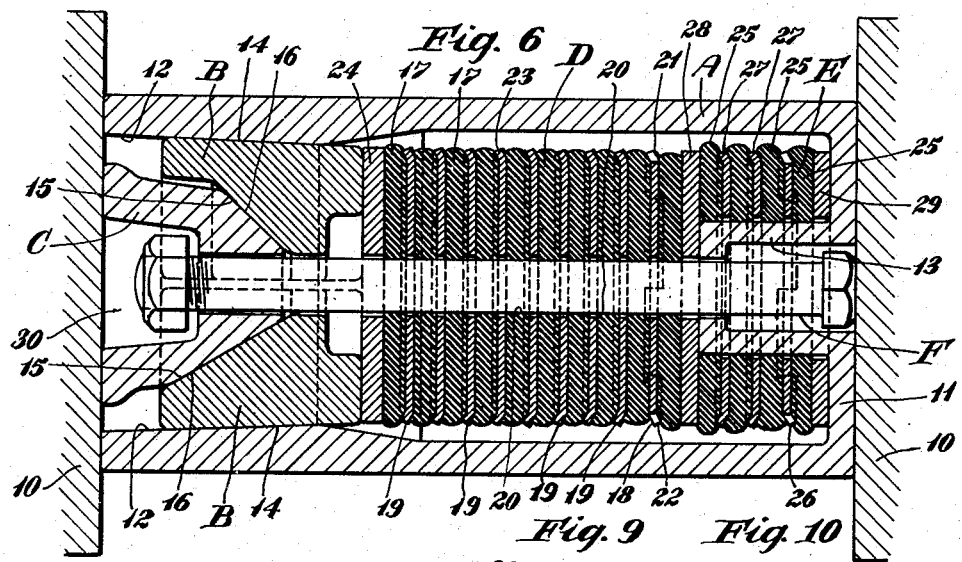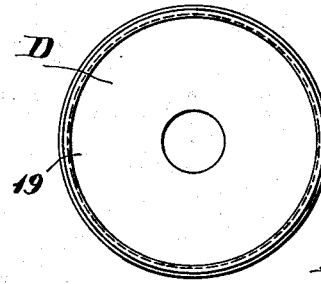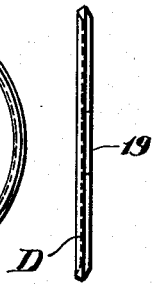
Inventor
Arnold E. Dentler
By Henry Fuchs
Atty.

Patented Nov. 13, 1951

2,574,629

UNITED STATES PATENT OFFICE 2,574,629

FRICTION SHOCK ABSORBING
MECHANISM

Arnold E. Dentler, La Grange, Ill., assignor to
W. H. Miner, Inc., Chicago, Ill., a corporation
of Delaware Application August 12, 1946, Serial No. 689,943

3 Claims. (Cl. 213—34)

This invention relates to improvements in friction shock absorbing mechanisms.

One object of the invention is to provide a friction shock absorbing mechanism comprising relatively movable friction elements, the movement of which is yieldingly opposed by a pair of cushioning elements, each comprising a plurality of rubber mats or pads, wherein one of said elements is of lesser capacity than the other to provide for soft initial action during compression of the mechanism.

A further object of the invention is to provide in a mechanism of the character indicated, wherein the rubber cushioning elements are composed of a plurality of rubber pads or mats and spacing members alternated with the mats of each element, and wherein the two elements are separated by follower means which has its movement restricted to protect the cushioning element of lesser capacity from being overloaded.

A still further object of the invention is to provide a rubber cushioning element composed of rubber mats or pads and spacing members alternated with said mats or pads, wherein the spacing members have peripheral flanges overhanging the mats to protect the same against damage.

Other objects of the invention will more clearly appear from the description and claims hereinafter following.

In the accompanying drawings forming a part of this specification, Figure 1 is a top plan view of my improved shock absorbing mechanism and cooperating main followers of a railway draft rigging. Figure 2 is a horizontal, longitudinal sectional view, corresponding substantially to the line 2—2 of Figure 3. Figure 3 is a front elevational view of Figure 1, looking toward the right in said figure. Figures 4 and 5 are transverse, vertical sectional views, corresponding respectively to the lines 4—4 and 5—5 of Figure 2. Figure 6 is a view, similar to Figure 2, showing the mechanism fully compressed. Figure 7 is a plan view of one of the spacing members of my improved mechanism. Figure 8 is an edge elevational view of Figure 7, looking toward the left in said figure. Figure 9 is a plan view of another spacing member. Figure 10 is an edge elevational view of Figure 9, looking toward the left in said figure.

My improved friction shock absorbing mechanism proper is mounted between the usual center or draft sills of a railway car and cooperates with the usual front and rear main followers, which followers are indicated by 10—10 in Figures 1 and 6 of the drawings.

My improved friction shock absorbing mechanism, as shown in the drawings, comprises broadly a friction casing A; three friction shoes B—B—B; a wedge block C; front and rear cushioning elements D and E; and a retainer bolt F.

The friction casing A is in the form of a tubular casting of hexagonal, transverse cross section, open at its front end and closed at its rear end by a transverse, vertical wall 11. At the forward or open end thereof, the casing is provided with three rearwardly, or inwardly converging, interior friction surfaces 12—12—12 of V-shaped, transverse cross section. A central, hollow boss 13 is provided interiorly of the casing A at the rear end thereof. The boss 13 projects from the inner side of the end wall 11.

The friction shoes B—B—B are arranged symmetrically about the central, longitudinal axis of the mechanism, each shoe having a V-shaped, outer friction surface 14 engaging the corresponding V-shaped friction surface 12 of the casing. Each shoe has a wedge face 15 on the inner side thereof.

The wedge block C, which is centrally disposed, has three inwardly converging wedge faces 16—16—16 engaging the wedge faces 15—15—15 of the respective shoes B—B—B.

The cushioning element D comprises a plurality of ring-shaped, washerlike rubber mats 17 arranged in series. A spacing member 18 is interposed between the two adjacent mats at the rear end of the cushioning element D, and a plurality of spacing members 19 are alternated with the remaining mats. All of these spacing members are of washerlike form having central openings 20. The spacing member 18 has forwardly and rearwardly projecting, peripheral flanges 21 and 22, these flanges being formed by slitting the outer edge of the member and bending adjacent sections alternately forwardly and rearwardly. Each side of the washer is thus provided with an interrupted flange composed of a plurality of spaced sections. Each spacing member 19 has a continuous, peripheral flange 23. The flanges 21, 22, and 23 of the spacing members 18 and 19 extend at acute angles to the flat body portions of said members and overhang the adjacent rubber mats to protect the same from damage. As shown in Figures 2 and 6, the flanges 23 of the members 19 all face in the same direction, that is, toward the front of the mechanism. A relatively heavy follower plate 24 in the form of a washer is interposed between the front end of the element D and the friction shoes B—B—B and bears on the outermost mat of the element D and the inner ends of the shoes. The rubber mats 17 are preferably secured to the spacing members by being vulcanized thereto.

The cushioning element E comprises a plurality of rubber mats 25 of washerlike form, similar to the mats 17 hereinbefore described, with the exception that the central openings thereof are larger, the same being of such a size as to loosely accommodate the boss 13 of the casing A. The rubber mats 25 are separated by spacing members 26 and 27, one member 26 and two members 27—27 being employed. The member 26 is similar to the member 18 hereinbefore described and the members 27 are similar to the members 19, with the exception that the central openings thereof are larger, being of a size to freely accommodate the boss 13. A washerlike follower member 28, similar to the follower member 24, is interposed between the cushioning elements D and E and another washerlike follower member 29 is interposed between the end wall 11 of the casing A and the cushioning element E. The follower 29 is similar to the followers 24 and 28 with the exception that the central opening is of a size to accommodate the boss 13. As will be evident, the cushioning element E is of lesser capacity than the element D, the individual mats of the former containing less rubber than those of the latter.

The mechanism is held assembled by the retainer bolt F, which extends through the wedge C, followers 24 and 28, and the mats and spacing members of the elements D and E, having its head, which is at the rear end thereof, seated in the hollow boss 13 of the casing, and the nut, which is at the front end thereof, seated in a pocket 30 provided in the wedge block C. The bolt F, in addition to holding the parts assembled, limits the expansion of the mechanism and maintains the cushioning elements under slight initial compression.

The normal full release position of the mechanism is shown in Figure 2. In this position of the parts, the follower 28 is spaced forwardly from the inner end of the boss 13 to provide for sufficient movement during operation of the mechanism to effect compression of the rear cushioning element E during part of the compression stroke.

The operation of my improved friction shock absorbing mechanism is as follows: Upon relative movement of the main followers 10—10 toward each other in either buff or draft action, the mechanism is compressed therebetween, forcing the wedge and friction shoes inwardly of the casing, along the friction surfaces thereof, against the resistance of the cushioning elements D and E, thereby providing the required frictional resistance to absorb shocks. During the first part of the compression stroke, the rubber element E, due to its lower capacity, will be compressed to a greater extent than the element D, thereby producing soft initial action. Compression of the element E continues until limited by the follower 28 coming into engagement with the boss 13. During further compression of the mechanism, the element D only is compressed, thereby providing the desired high frictional capacity required during the last part of the compression stroke. Compression of the mechanism is positively limited by engagement of the front follower 10 with the front end of the casing, as shown in Figure 6, thus preventing undue compression of the cushioning elements to protect the same against overloading and consequent damage.

When the actuating force is reduced, the expansive action of the cushioning elements D and E, returns all of the parts to the normal full release position shown in Figure 2, outward movement of the wedge being arrested by the retainer bolt F.

I claim:

1. In a friction shock absorbing mechanism, the combination with a friction casing; of a friction clutch slidingly telescoped within the casing; front and rear cushioning elements within said casing yieldingly opposing inward movement of the clutch, said rear element being of lesser capacity than said front element; a follower movable with respect to the casing and interposed between said elements for transmitting the pressure from said front to said rear element; and stop means on the casing engageable by said follower for limiting inward movement thereof after the mechanism has been compressed to a predetermined extent, less than the full compression stroke thereof, to arrest compression of said rear element during the remainder of the compression stroke.

2. In a friction shock absorbing mechanism, the combination with a friction casing; of a friction clutch slidingly telescoped within the casing; front and rear, rubber cushioning elements within said casing yieldingly opposing inward movement of the clutch, said rear element being of lesser capacity than said front element; a follower movable with respect to the casing and interposed between said elements for transmitting the pressure from said front to said rear element; and stop means on the casing engageable by said follower for limiting inward movement thereof after the mechanism has been compressed to a predetermined extent, less than the full compression stroke thereof, to arrest compression of said rear element during the remainder of the compression stroke.

3. In a friction shock absorbing mechanism, the combination with a friction casing open at one end and closed at the other end by a transverse wall; of an inwardly projecting stop member on said transverse wall; a friction clutch slidingly telescoped within the casing; front and rear cushioning elements within said casing yieldingly opposing inward movement of said clutch, said rear element being of lesser capacity than said front element; and a follower movable with respect to the casing and interposed between said elements for transmitting the pressure from said front to said rear element, said stop member being engageable by said follower for limiting inward movement thereof after the mechanism has been compressed to a predetermined extent less than the full compression stroke of the mechanism to arrest compression of said rear element during the remainder of the compression stroke.

ARNOLD E. DENTLER.

REFERENCES CITED

The following references are of record in the file of this patent:

UNITED STATES PATENTS

| Number | Name | Date |
|---|---|---|
| 485,553 | Marriott | Nov. 1, 1892 |
| 1,096,120 | O'Connor | May 12, 1914 |
| 1,122,940 | Johnson | Dec. 29, 1914 |
| 1,251,089 | O'Connor | Dec. 25, 1917 |
| 1,700,229 | Lounsbury | Jan. 29, 1929 |
| 1,972,041 | Emerson et al. | Aug. 28, 1934 |
| 2,039,759 | Webb | May 5, 1936 |
| 2,187,156 | Johnson | Jan. 16, 1940 |
| 2,230,029 | Eaton | Jan. 28, 1941 |
| 2,260,532 | Lindeman | Oct. 28, 1941 |
| 2,430,494 | Dath | Nov. 11, 1947 |
| 2,430,505 | Haseltine | Nov. 11, 1947 |

FOREIGN PATENTS

| Number | Country | Date |
|---|---|---|
| 428,966 | Great Britain | May 22, 1935 |
| 587,498 | Germany | Nov. 3, 1933 |
| 733,478 | France | July 11, 1932 |